(12) United States Patent
Kwon

(10) Patent No.: US 9,488,972 B2
(45) Date of Patent: Nov. 8, 2016

(54) APPARATUS AND METHOD FOR CONTROLLING PROGRAMMABLE LOGIC CONTROLLER

(71) Applicant: LSIS CO., LTD., Anyang-si, Gyeonggi-do (KR)

(72) Inventor: Jae Il Kwon, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 818 days.

(21) Appl. No.: 13/868,949

(22) Filed: Apr. 23, 2013

(65) Prior Publication Data

US 2013/0331955 A1    Dec. 12, 2013

(30) Foreign Application Priority Data

Jun. 7, 2012 (KR) .................. 10-2012-0061126

(51) Int. Cl.
G05B 19/18 (2006.01)
G05B 19/02 (2006.01)
G05B 19/05 (2006.01)

(52) U.S. Cl.
CPC ............ *G05B 19/02* (2013.01); *G05B 19/054* (2013.01)

(58) Field of Classification Search
CPC .............................. G05B 19/02; G05B 10/054
USPC ............................................................ 700/7
See application file for complete search history.

(56) References Cited

U.S. PATENT DOCUMENTS

| 5,075,880 A | * | 12/1991 | Moses | G06F 17/17 708/290 |
| 5,087,914 A | * | 2/1992 | Sooch | H03M 3/384 341/118 |
| 5,764,546 A | * | 6/1998 | Bryant | G05B 19/0423 702/108 |
| 7,956,779 B2 | * | 6/2011 | Chen | G09G 3/3688 341/138 |
| 2002/0171852 A1 | * | 11/2002 | Zhang | G06T 5/009 358/1.9 |
| 2007/0078542 A1 | | 4/2007 | Alderson | |

FOREIGN PATENT DOCUMENTS

| JP | 58-008304 | 1/1983 |
| JP | 07-078007 | 3/1995 |
| JP | 2003044846 | 2/2003 |
| KR | 20090093675 | 9/2009 |

OTHER PUBLICATIONS

Korean Intellectual Property Office Application Serial No. 10-2012-0061126, Office action dated Jun. 28, 2013, 4 pages.
Korean Intellectual Property Office Application Serial No. 10-2012-0061126, Notice of Allowance dated Dec. 25, 2013, 2 pages.
Japan Patent Office Application Serial No. 2013-108816, Office Action dated Feb. 12, 2014, 2 pages.

* cited by examiner

*Primary Examiner* — Kenneth M Lo
*Assistant Examiner* — Chad Rapp
(74) *Attorney, Agent, or Firm* — Lee Hong Degerman Kang & Waimey

(57) ABSTRACT

Disclosed are an apparatus and a method for controlling a PLC output signal. The method includes receiving the PLC digital output signal and interpolating a gradient of the PLC digital output signal by applying a nonlinear correction function to the received PLC digital output signal. The embodiment provides a stable output control apparatus and a stable output control method capable of allowing an external device controlled by a PLC to smoothly output a response and a PLC output is gradually changed to prevent the external device to be controlled from being malfunctioned or broken.

10 Claims, 4 Drawing Sheets

APPARATUS AND METHOD FOR CONTROLLING PROGRAMMABLE LOGIC CONTROLLER

CROSS-REFERENCE TO RELATED APPLICATIONS

Pursuant to 35 U.S.C. 119(a) this application claims the benefit of earlier filing date and right of priority to Korean Patent Application No. 10-2012-0061126, filed on Jun. 7, 2012, the contents of which is incorporated by reference herein in its entirety.

BACKGROUND

The embodiment relates to an apparatus and a method for controlling an output signal of a programmable logic controller (PLC).

Automatic equipment used in industrial fields consists of mechanical equipment including a relay. There is a difficulty to change the automatic equipment consisting of the mechanical equipment because internal circuits of the automatic equipment must be changed. In order to overcome such a difficulty, the PLC, which is a general control device, is used.

The PLC converts a digital signal input by a user into an analog signal and transmits the analog signal to external devices to control the external devices.

FIG. 1 is a graph showing general PLC response characteristics.

Referring to FIG. 1, a value of a PLC digital signal output 101 is abruptly changed at a specific point 107. Thus, a value of a PLC analog signal output 103, which is obtained by converting the PLC digital signal output 101, is also abruptly changed at the specific point 107.

Meanwhile, if the PLC analog signal output 103 is transferred to an external device, a load response 105 of the external device may become a transient response 109 at the specific point 107 at which the value of the PLC analog signal output 103 is abruptly changed. The external device may malfunction or, in extreme cases, may be broken due to the transient response 109.

SUMMARY

The embodiment provides an apparatus and a method for controlling a PLC, capable of preventing a transient response of an external device by interpolating a PLC output signal to be supplied to the external device.

A method of controlling a PLC digital output signal according to the embodiment includes receiving the PLC digital output signal; and interpolating a gradient of the PLC digital output signal by applying a nonlinear correction function to the received PLC digital output signal.

An apparatus for controlling a PLC digital output signal according to the embodiment includes a calculation unit to calculate a value of a signal to be actually output, an interpolation unit to interpolate a signal by applying a nonlinear correction function, a conversion unit to convert a digital signal into an analog signal, and a control unit that controls the calculation unit such that the PLC digital output signal is calculated as an actual output value, controls the interpolation unit to apply the nonlinear correction function to the PLC digital output signal calculated in the calculation unit, and controls the conversion unit to convert the PLC digital output signal interpolated in the interpolation unit into a PLC analog output signal.

According to the embodiment, it is possible to provide an apparatus and a method for controlling a PLC, capable of preventing a transient response of an external device by interpolating a PLC output signal to be supplied to the external device.

DETAILED DESCRIPTION OF THE EMBODIMENTS

Hereinafter, embodiments will be described in detail with reference to accompanying drawings.

Figure 1:
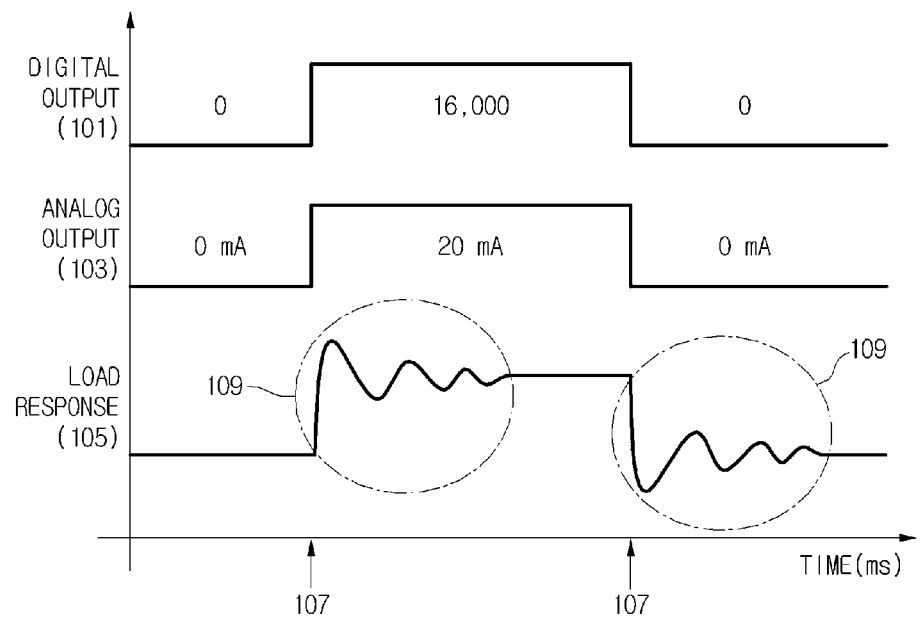
FIG. 1 is a graph showing general PLC response characteristics.
Figure 2:
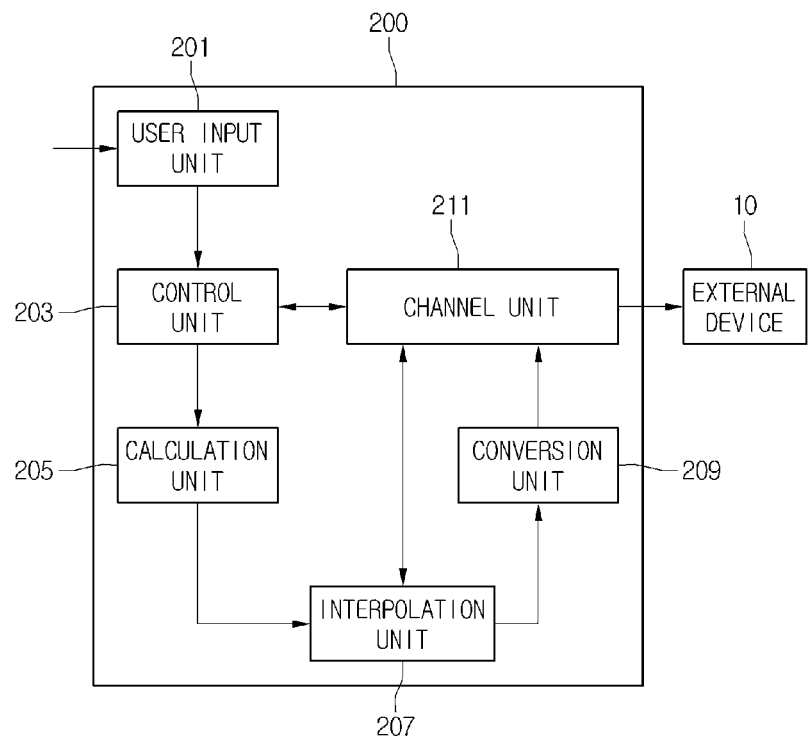
FIG. 2 is a block diagram showing a configuration of a PLC control apparatus according to the embodiment.

FIG. 2 is a block diagram showing a configuration of a PLC control apparatus according to the embodiment.

Referring to FIG. 2, the PLC control apparatus 200 includes a user input unit 201, a control unit 203, a calculation unit 205, an interpolation unit 207, a conversion unit 209, and a channel unit 211.

The user input unit 201 receives user's input to select an analog output channel.

The channel may refer to a path to transmit a PLC output signal to an external device 10. The user may set at least one of a plurality of channels as a transmission path by using the user input unit 201.

The control unit 203 controls a signal to be output to the external device 10 through the channel selected by the user.

The control unit 203 may select at least one channel according to the user's input received in the user input unit 201. For instance, the control unit 203 may transmit a signal, which selects at least one of a plurality of channels, to a channel unit 211 to be described later.

At this time, if the selected channel has a preset value, the control unit 203 may initialize the preset value. For instance, the control unit 203 may transmit an initialization command signal for the selected signal to the channel unit 211.

In addition, the control unit 203 can confirm the allowance of the digital-analog conversion in the selected channel. For instance, the control unit 203 may inquire the allowance of the digital-analog conversion in the selected channel to the channel unit 211.

If the digital-analog conversion in the selected channel is prohibited, the control unit 203 may terminate the PLC output signal control after initializing the data. For instance, upon receiving the answer of prohibiting the digital-analog conversion in the selected channel from the channel unit 211, the control unit 211 may terminate the PLC output signal control. At this time, initialized data may refer to data, which are input for the PLC output signal control, or preset data, but the embodiment is not limited thereto.

In contrast, if the digital-analog conversion in the selected channel is allowed, the control unit 203 may perform the PLC output signal control. For instance, upon receiving the answer of allowing the digital-analog conversion in the selected channel from the channel unit 211, the control unit 211 may continuously perform the PLC output signal control. The control unit 211 may transfer a PLC digital output signal to the calculation unit 205, which will be described later, for the PLC output signal control.

The calculation unit 205 calculates a value of the PLC digital output signal. The PLC digital output signal may refer to a digital output signal which is actually transferred to the external device 10 from the PLC control apparatus 200.

The calculation unit 205 can calculate the value of the PLC digital output signal according to the analog resolution.

For instance, the calculation unit 205 may calculate the value of the PLC digital output signal in the range of 0 to 4000 when the analog resolution is 12 bits and may calculate the value of the PLC digital output signal in the range of 0 to 16000 when the analog resolution is 14 bits.

At this time, the range of the PLC digital output signal may refer to the similarity between the digital output signal and the analog output signal. For instance, the similarity between the digital output signal and the analog output signal may become high as the range of the PLC digital output signal value is wide.

The interpolation unit 207 interpolates the PLC digital output signal calculated in the calculation unit 205. After the interpolation has been performed by the interpolation unit 207, an edge of the PLC digital output signal may have an S-shape curve in the graph.

The interpolation unit 207 may confirm the allowance of the interpolation in the selected channel. For instance, the interpolation unit 207 may inquire the allowance of the interpolation in the selected channel to the channel unit 211.

If the interpolation in the selected channel is allowed, the interpolation unit 207 may interpolate the calculated PLC digital output signal. For instance, upon receiving the answer of allowing the interpolation in the selected channel from the channel unit 211, the interpolation unit 207 may interpolate the PLC digital output signal.

The interpolation unit 207 may interpolate the digital output signal by using a sigmoid function. In addition, the interpolation unit 207 may individually adjust the offset gain of the PLC digital output signal, which has been interpolated through the sigmoid function, by using a linear correction function.

In addition, the interpolation unit 207 may interpolate the PLC digital output signal according to at least one of a predetermined interpolation frequency, a target value and a scan time. For instance, the interpolation frequency may be set according to the user's input, and the PLC digital output signal may be more smoothly interpolated as the interpolation frequency is increased.

The conversion unit 209 converts the interpolated PLC digital output signal into the PLC analog output signal.

Since the conversion unit 209 converts the PLC digital output signal, which has been interpolated in the interpolation unit 207, into the PLC analog output signal, the PLC analog output signal having the edge of the S-shape curve can be output. The PLC analog output signal converted by the conversion unit 209 may be amplified and then transferred to the channel unit 211.

The channel unit 211 transfers the PLC analog output signal, which is transmitted from the conversion unit 209, to the external device 10.

Therefore, the PLC control apparatus 200 can transmit the PLC analog output signal, in which the S-shape interpolation has been completed, to the external device 10.

Figure 3:
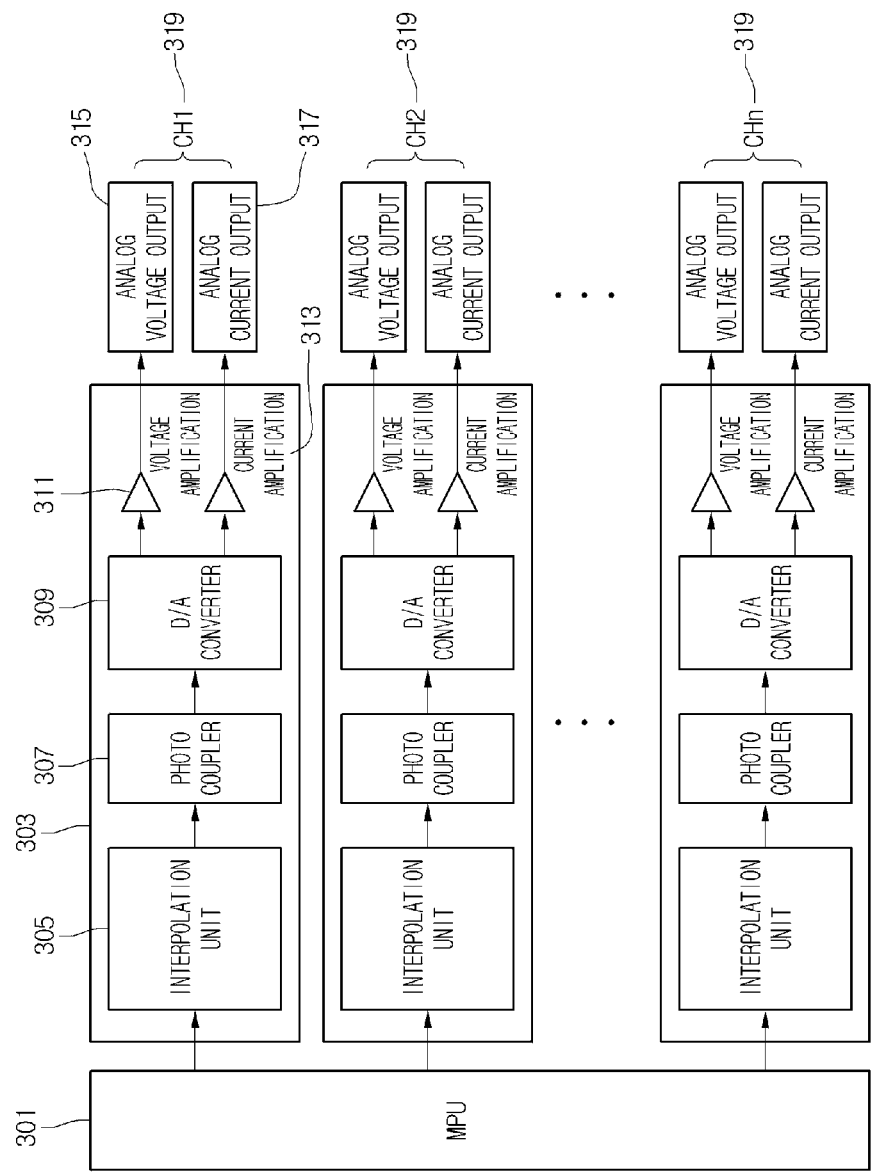
FIG. 3 is a block diagram showing a configuration of a PLC output control apparatus according to the embodiment.

FIG. 3 is a block diagram showing a configuration of the PLC output control apparatus according to the embodiment.

Referring to FIG. 3, the PLC output control apparatus may include a microprocessor unit (MPU) 301 and an analog output circuit 303. The PLC output control apparatus shown in FIG. 3 may be one embodiment of the PLC output control apparatus described above with reference to FIG. 2. In addition, the PLC output control apparatus shown in FIG. 3 may be a part of the PLC or may be separated from the PLC, and the embodiment is not limited thereto.

The MPU 301 may generate a digital signal to transfer the digital signal to the analog output circuit 303.

The analog output circuit 303 includes an interpolation unit 305, a photo coupler 307, a DA converter 309, amplification units 311 and 313 and a channel 319. The analog output circuit 303 converts a digital signal received from the MPU 301 into an analog signal and outputs an analog voltage and an analog current through the channel 319 after the voltage amplification and the current amplification. The PLC transmits the analog voltage and the analog current to the external device to control the operation of the external device.

The interpolation unit 305 can interpolate the digital signal. The digital signal is output in the form of a step function having a steep gradient. That is, in general, the digital signal has a waveform having the value that is abruptly changed from 0 to the target value or from the target value to 0 at the specific point. The interpolation unit 305 interpolates the digital signal such that the digital signal output can be gradually changed from 0 to the target value or from the target value to 0 within a predetermined time range, thereby smoothing the gradient of the digital signal.

The photo coupler 307 can electrically insulate the MPU 301 from the analog output circuit 303. Thus, the digital signal generated from the MPU 301 can be transferred to the DA converter 309 after being insulated by the photo coupler 307.

The DA converter 309 can convert the digital signal, which has been interpolated to have a smooth gradient, into the analog signal.

The amplification units 311 and 313 amplify the intensity of the analog signal output from the DA converter 309 to the extent that the external device can be driven. The amplification units 311 and 313 may include a voltage amplifier and a voltage amplifier. The voltage amplifier 311 may include an OP-AMP for amplifying an analog voltage signal. The current amplifier 313 may include an OP-AMP for amplifying an analog current signal.

An analog voltage signal 315 and an analog current signal 317 for driving the external device are output through one channel 319. The user can set the analog output channel 319 according to the external device. If the user sets a first channel CH1, the analog output circuit 303 may convert the digital signal into the analog signal only when the first channel CH1 allows the analog signal conversion.

Figure 4:
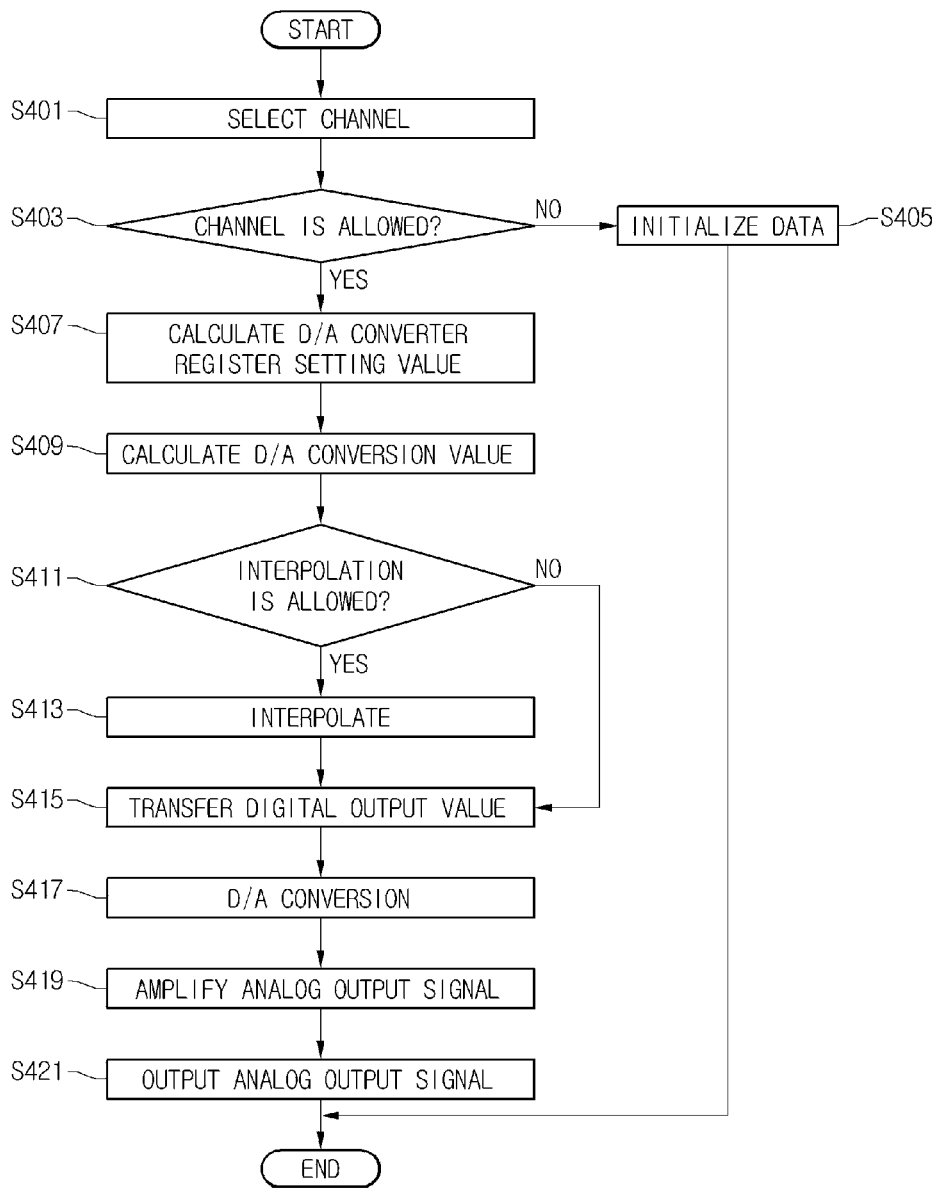
FIG. 4 is a flowchart showing a PLC output control method according to the embodiment.

FIG. 4 is a flowchart showing a PLC output control method according to the embodiment.

Referring to FIG. 4, the channel 319 can be set according to the user's selection in order to convert the PLC digital output into the PLC analog output for driving the external device. The MPU 301 selects the analog output circuit 303 including the channel 319 set by the user (S401). The MPU 301 can initialize the preset value in order to input a new value to the selected analog output circuit 303.

The MPU 301 may determine whether the digital-analog conversion is allowed in the analog output circuit 303 including the channel 319 (S403). If the digital-analog conversion is not allowed in the analog output circuit 303, the MPU 301 may initialize the preset data of the analog output circuit 303 and terminate the digital-analog conversion process (S405).

If the digital-analog conversion is allowed in the analog output circuit 303, the analog output circuit 303 may calculate a register setting value required for the digital-analog conversion of the DA converter 309 (S407).

In addition, the analog output circuit 303 may calculate the digital output value to be output actually (S409). The analog output circuit 303 may calculate the digital output value in the range of 0 to 4000 when the analog resolution is 12 bits and may calculate the digital output value in the range of 0 to 16000 when the analog resolution is 14 bits.

Then, the analog output circuit 303 may determine whether the digital output interpolation is allowed in the selected channel 319 (S411). If the interpolation is not allowed in the channel 319, the digital output is transferred to the DA converter 309 through the photo coupler 307 (S415).

If the interpolation is allowed in the channel 319, the digital output is transferred to the interpolation unit 305 and the interpolation unit 305 interpolates the digital output (S413). The interpolation unit 305 can interpolate the PLC digital output in the form of an S-shape by executing the nonlinear interpolation algorithm and the linear interpolation algorithm. The S-shape interpolation refers to the interpolation to interpolate the output having a steep gradient in the form of a step function into the output having a smooth gradient. The sigmoid function may be utilized to execute the nonlinear interpolation algorithm, and the linear correction function may be utilized to execute the linear interpolation algorithm. The linear correction function is used to adjust the offset gain which is not implemented by the sigmoid function.

For instance, the sigmoid application function is expressed as following equation 1.

$$P_1(t) = \frac{1}{1 + e^{\left(-0.7 \times \left(\frac{10 \times t}{\alpha} - 5\right)\right)}} \times \beta \quad \text{Equation 1}$$

α: interpolation frequency
β: target value
t: scan time (ms)

Equation 1 is the sigmoid application function obtained by transforming the coefficient of the sigmoid function.

The interpolation frequency (α) refers to the number of times for drawing straight lines to draw a graph approximate to a curve by using straight lines when the sigmoid application function is represented in the graph. The digital output approximate to the curve can be obtained as the interpolation frequency (α) is increased.

The target value (β) refers to the final digital output value. The interpolation frequency (α) and the target value (β) may be set depending on the purpose of the user.

The scan time (t) refers to the time to reach the target value from 0.

In Equation 1, P1(t) refers to the digital output to which the nonlinear interpolation algorithm has been executed. Referring to Equation 1, the P1(t) does not output the target value (β), but is converged even if the scan time (t) is infinitely increased. Therefore, the interpolation unit 305 must use the linear correction function to output the target value (β).

For instance, the linear correction function is expressed as following equation 2.

$$P_2(t) = 1.0623 \times \left(P_1(t) - \frac{\beta}{2}\right) + \frac{\beta}{2} \quad \text{Equation 2}$$

In Equation 2, P2(t) refers to the digital output which is obtained by executing the linear interpolation algorithm with respect to the digital output P1(t) to which the nonlinear interpolation algorithm has been executed. Since Equation 2 is for the offset gain adjustment, it is expressed as a simple equation and the user may preset the threshold value. If the P1(t) is applied to Equation 2, the offset value can be output at the threshold value or less, and the target value (β) can be output at the value above the threshold value. As a result of the linear interpolation algorithm, the P2(t) can output the target value (β) when the scan time (t) has elapsed.

Then, the final digital output to which the interpolation algorithm has been executed or the digital output to which the interpolation algorithm is not executed is transferred to the DA converter 309 through the photo coupler 307 (S415).

The DA converter 309 converts the digital output signal into the analog output signal (S417).

The voltage amplifying unit 311 amplifies the converted analog output voltage such that the analog output voltage has the intensity sufficient for driving the external device and the current amplifying unit 313 amplifies the converted analog output current such that the analog output current has the intensity sufficient for driving the external device (S419).

Then, the analog output circuit 303 outputs the analog output voltage or current through the channel 319 so that the PLC can control the external device connected to the channel (S421).

Figure 5:
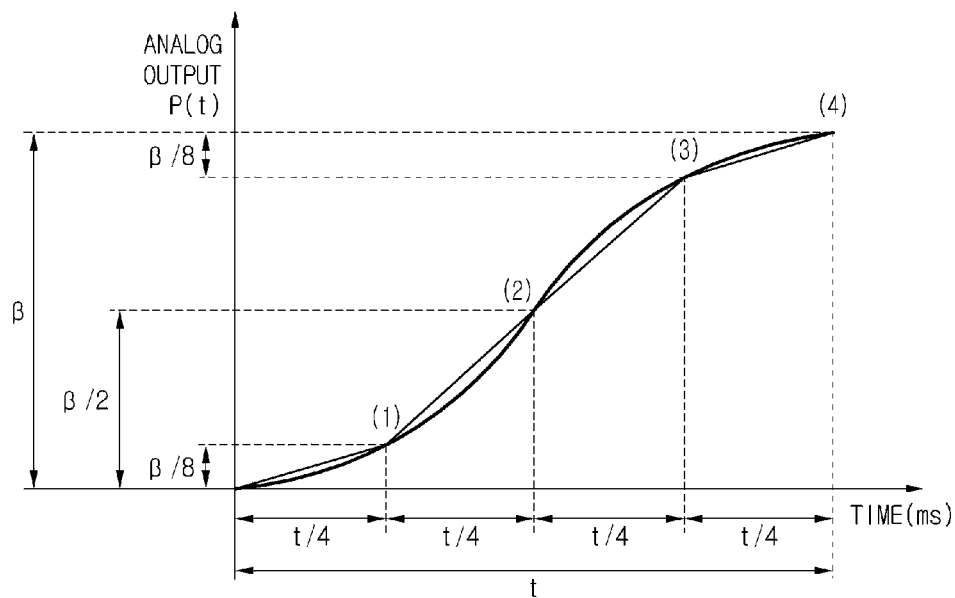
FIG. 5 is a graph to explain an output according to the embodiment.

FIG. 5 is a graph to explain an output according to the embodiment.

Referring to FIG. 5, the analog output P(t) is obtained by converting the digital output signal, to which the interpolation algorithm has been executed, to the analog signal. In FIG. 5, straight lines refer to the digital output signals to which the interpolation algorithm has been executed, and a curve line refers to the analog output signal. The target value of the analog output signal is β and t is the scan time required for the output value of the analog output signal to reach the target value from 0. For instance, if the interpolation frequency α is 4, the analog output P(t) is β/8 at a point of t/4, β/2 at a point of t/2, 7β/8 at a point of 3t/4, and β at a point of t. That is, if the scan time is divided into four, the graph of the analog output P(t) has the S-shape where first and fourth sections of the scan time have the smoother gradient and second and third sections of the scan time have the steeper gradient. If the analog output signal, to which the S-shape interpolation has been completed, is applied to the external device, the effect shown in FIG. 6 may be represented.

Figure 6:
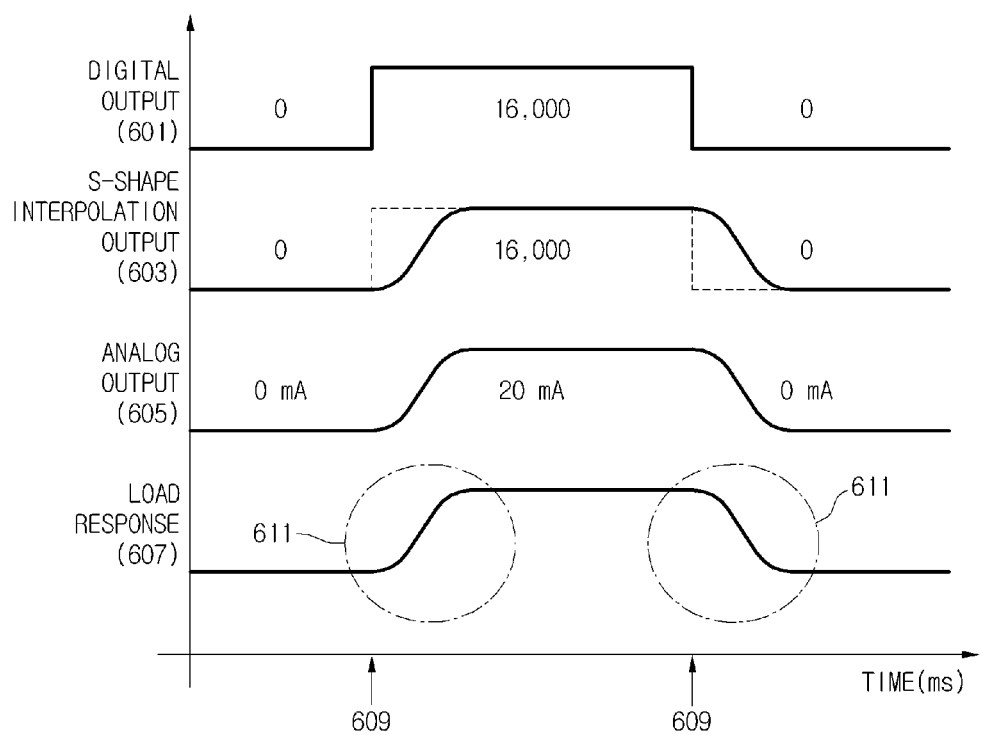
FIG. 6 is a graph showing PLC response characteristics according to the embodiment.

FIG. 6 is a graph showing PLC response characteristics according to the embodiment.

Referring to FIG. 6, a digital output 601 transferred from the MPU 301 is in the form of a step function and the value of the digital output 601 is changed from 0 to 16000 at an output change point 609. However, a digital output 603 interpolated through the interpolation unit 305 is in the form of S-shape and the gradient of the digital output 603 is gradually changed from the output change point 609 so that the value of the digital output 603 reaches the initial value (0) or the target value (16000). In addition, an analog current output 605 obtained by converting the interpolated digital output 603 is also in the form of S-shape and the gradient is gradually changed from the output change point 609 so that the value of the analog current output 605 reaches the initial value (0) or the target value (20 mA).

As a result, a load that receives the analog output 605 can output the response in the form of S. The analog output circuit 303 according to the embodiment can control the external device to output the smooth response other than the transient response indicated by reference numeral 611, so that the control device having superior stability can be provided. In addition, the analog output circuit 303 according to the embodiment can gradually change the intensity of the voltage or current input into the external device, so that the external device can be prevented from being malfunctioned or broken.

Although embodiments have been described with reference to a number of illustrative embodiments thereof, it should be understood that numerous other modifications and embodiments can be devised by those skilled in the art that will fall within the spirit and scope of the principles of this disclosure.

Therefore, the embodiments do not intend to limit the technical features of the disclosure but intend to explain the technical features of the disclosure and the technical features of the disclosure may not limited by the above embodiments.

What is claimed is:

1. A method of controlling a PLC digital output signal of a PLC apparatus, the method comprising:
    receiving the PLC digital output signal; and
    interpolating a gradient of the PLC digital output signal by applying a nonlinear correction function to the received PLC digital output signal to produce an interpolated PLC digital output signal that is proportionate to a target value and inversely proportionate to a frequency of the interpolating, and
    wherein the interpolated PLC digital output signal has an increasingly smoother gradient as the frequency of the interpolating is increased transmitting the interpolated PLC digital output signal to control an external device so that the external device can be prevented from being malfunctioned or broken.

2. The method of claim 1, wherein the interpolated PLC digital output signal of the nonlinear correction function is proportionate to a scan time the PLC digital output signal reaches the target value from 0.

3. The method of claim 1, wherein the nonlinear correction function comprises a sigmoid function.

4. The method of claim 1, further comprising:
    selecting at least one channel according to a user input, wherein the interpolating of the gradient is performed only when a digital-analog conversion and an interpolation are allowed in the selected channel.

5. The method of claim 1, further comprising:
    performing an interpolation by applying a linear correction function to adjust an offset gain of the PLC digital output signal to which the nonlinear correction function is applied.

6. A PLC control apparatus, comprising:
    a calculator to calculate a value of a signal to be actually output;
    an interpolator to interpolate a signal by applying a nonlinear correction function;
    a converter to convert a digital signal into an analog signal; and
    a controller to control the calculator such that a PLC digital output signal is calculated as an actual output value, control the interpolator to apply the nonlinear correction function to the PLC digital output signal calculated in the calculator, and control the converter to convert the PLC digital output signal interpolated in the interpolator into a PLC analog output signal,
    wherein the interpolated PLC digital output signal is proportionate to a target value and inversely proportionate to a frequency of the interpolating,
    wherein the PLC digital output signal has an increasingly smoother gradient as the frequency of the interpolating is increased transmitting the interpolated PLC digital output signal to control an external device so that the external device can be prevented from being malfunctioned or broken.

7. The apparatus of claim 6, wherein the interpolated PLC digital output signal of the nonlinear correction function is proportionate to a scan time the PLC digital output signal reaches the target value from 0.

8. The apparatus of claim 6, wherein the nonlinear correction function used in the interpolator comprises a sigmoid function.

9. The apparatus of claim 6, further comprising:
    a user input receiver to receive a user input for selecting at least one channel,
    wherein the controller transmits the PLC digital output signal to an external device, selects at least one channel according to the user input, determines whether a digital-analog conversion and an interpolation are allowed in the selected channel, and controls the calculator, the interpolator and the converter only when the digital-analog conversion and the interpolation are allowed in the selected channel.

10. The apparatus of claim 6, wherein the interpolator performs an interpolation by applying a linear correction function to adjust an offset gain of the PLC digital output signal to which the nonlinear correction function is applied.

* * * * *